US011585321B2

(12) United States Patent
Liebman et al.

(10) Patent No.: US 11,585,321 B2
(45) Date of Patent: Feb. 21, 2023

(54) METHOD AND SYSTEM FOR ATTACHING VORTEX SUPPRESSION DEVICES TO A WIND TURBINE TOWER

(71) Applicant: General Electric Company, Schenectady, NY (US)

(72) Inventors: Noah David Liebman, Clemson, SC (US); Benjamin Patrick Hallissy, Greenville, SC (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 17/082,293

(22) Filed: Oct. 28, 2020

(65) Prior Publication Data

US 2022/0128028 A1 Apr. 28, 2022

(51) Int. Cl.
*F03D 7/02* (2006.01)

(52) U.S. Cl.
CPC ........ *F03D 7/0296* (2013.01); *F05B 2230/60* (2013.01); *F05B 2260/96* (2013.01)

(58) Field of Classification Search
CPC ........ F03D 7/0296; F03D 80/00; F03D 13/20; F05B 2230/60; F05B 2260/96; F05B 2240/122; F05B 2250/25; Y02E 10/72; Y02E 10/728; F16L 1/123; E21B 17/01; F15D 1/10
See application file for complete search history.

(56) References Cited

U.S. PATENT DOCUMENTS

| 3,991,550 | A | * | 11/1976 | Cohen | H02G 7/14 |
| | | | | | 57/215 |
| 4,180,369 | A | * | 12/1979 | Ottosen | F03D 1/00 |
| | | | | | 415/908 |
| 6,019,549 | A | * | 2/2000 | Blair | F15D 1/10 |
| | | | | | 52/592.4 |
| 6,347,911 | B1 | * | 2/2002 | Blair | E02D 5/60 |
| | | | | | 52/592.4 |
| 6,695,539 | B2 | | 2/2004 | McMillan et al. | |
| 6,695,540 | B1 | | 2/2004 | Taquino | |
| 6,896,447 | B1 | | 5/2005 | Taquino | |

(Continued)

FOREIGN PATENT DOCUMENTS

| CN | 102121356 B | 2/2013 |
| CN | 103485732 A | 1/2014 |

(Continued)

OTHER PUBLICATIONS

European Search Report for EP application No. 21203890.5, dated Mar. 29, 2022.

*Primary Examiner* — David E Sosnowski
*Assistant Examiner* — Wayne A Lambert
(74) *Attorney, Agent, or Firm* — Dority & Manning, P.A.

(57) ABSTRACT

A wind turbine includes a tower and a vortex-induced vibration (VIV) mitigation system configured on the tower. The VIV mitigation system has a rod attached to an outer surface of the tower and extending longitudinally along an axis of the tower. A plurality of strake support guides extend transversely from and are spaced apart along the rod, the strake support guides comprising a length and a shape to retain a strake supported thereon. A strake is wrapped in a helical pattern around the tower, wherein at least a plurality of wraps of the strake are laid on and supported by the strake support guides.

20 Claims, 4 Drawing Sheets

(56) References Cited

U.S. PATENT DOCUMENTS

| | | | |
|---|---|---|---|
| 6,948,884 B2 | 9/2005 | Xu et al. | |
| 7,147,402 B2 * | 12/2006 | Edfeldt | F16L 57/02 |
| | | | 405/159 |
| 7,458,752 B2 * | 12/2008 | Esselbrugge | E21B 17/01 |
| | | | 405/211 |
| 7,624,544 B2 * | 12/2009 | Llorente Gonzalez | |
| | | | B63B 21/502 |
| | | | 52/84 |
| 8,256,993 B2 * | 9/2012 | Branchut | E21B 17/01 |
| | | | 405/224.2 |
| 8,511,245 B2 * | 8/2013 | Dehne | F16L 1/123 |
| | | | 114/243 |
| 8,770,894 B1 * | 7/2014 | Allen | E21B 17/01 |
| | | | 405/211.1 |
| 9,416,557 B2 * | 8/2016 | Moeller | E04H 12/00 |
| 9,476,171 B2 * | 10/2016 | Georgakis | F15D 1/10 |
| 9,523,456 B1 * | 12/2016 | Allen | E21B 17/22 |
| 9,567,745 B2 * | 2/2017 | Moeller | F03D 13/40 |
| 9,845,644 B2 | 12/2017 | Howard et al. | |
| 10,337,649 B1 * | 7/2019 | Dehne | E21B 17/012 |
| 10,473,131 B1 | 11/2019 | Allen et al. | |
| 10,808,683 B2 * | 10/2020 | Jensen | F03D 80/00 |
| 2003/0213113 A1 | 11/2003 | McMillan et al. | |
| 2020/0124221 A1 * | 4/2020 | Christman | F16L 55/041 |

FOREIGN PATENT DOCUMENTS

| | | | | |
|---|---|---|---|---|
| CN | 105927479 A | * | 9/2016 | |
| CN | 107035623 A | * | 8/2017 | |
| CN | 109737012 A1 | | 5/2019 | |
| CN | 109185051 B | * | 4/2020 | F03D 3/062 |
| CN | 211874652 U | * | 11/2020 | |
| DE | 202010002845 U1 | * | 8/2010 | F03D 13/20 |
| EP | 1601855 B1 | | 2/2007 | |
| EP | 18811951 A1 | | 1/2008 | |
| EP | 3486480 A1 | | 5/2019 | |
| KR | 2013076040 A | * | 7/2013 | |
| KR | 20150052486 A | * | 5/2015 | |
| WO | WO-9527101 A1 | * | 10/1995 | E02B 17/0017 |
| WO | WO-0177563 A1 | * | 10/2001 | E02B 17/0017 |

* cited by examiner

METHOD AND SYSTEM FOR ATTACHING VORTEX SUPPRESSION DEVICES TO A WIND TURBINE TOWER

FIELD

This invention relates generally to wind turbine towers, and more particularly, to a system and method for attaching strake-type vortex suppression devices to the wind turbine tower.

BACKGROUND

Wind turbine towers and other types of generally slender tower structures are subject to vortex-induced vibrations (VIV). Without mitigation and at the right wind conditions, vortices will coherently shed from alternating sides of the tower causing a fluctuating load and increasing the swaying motion of the tower perpendicular to the wind direction. For modern wind turbine towers, this motion can reach upwards of +/−2 m amplitude in the field, making continued installation of the tower and machine head essentially impossible, which can result in costly crane downtime as well as overall project delay. Also, if the vibrations continue, significant fatigue damage to the lower tower sections may result, which can drastically reduce tower lifespan. This issue will become more of a concern as the industry turns to taller, more slender, and/or less rigid towers.

VIV mitigation is thus an ongoing concern in the industry and VIV mitigation is generally recognized as a necessity for towers that exceed 100 m in height.

Various systems and methods of VIV mitigation have been utilized or suggested in the industry. For example, rolling mass absorbers, oil dampers, friction dampers, and vortex generator systems have been used on wind turbine towers for this purpose. Another system utilizes helical strakes in the form of tubes that are generally wrapped around the highest 1-3 sections of the wind turbine tower. The strakes function to disrupt the coherent vortex shedding around the tower that is required for VIV formation, thus preventing VIV before it occurs. Effective design for the helical strakes in terms of helical pitch, number, and size of strakes is based on a number of factors. However, it can be difficult to implement the designs and consistently maintain/hold the strakes in the design over time. The strakes and their associated installation cables can be quite long (e.g., 20-30 m) and heavy and tend to sag. This results in installed strake configurations that are not robust or repeatable. The strakes will lose their installed pattern over time, which can significantly degrade their function. Additionally, tensile load in the cables causes the strakes themselves to deform cross-sectionally and become too small relative to the tower diameter to be effective.

Additionally, strakes are typically installed manually by personnel on site who, for each tower section, wind the strakes around the tower can. This can occur in the horizontal configuration of the tower section where dirt and debris under the tower becomes an issue, or in the vertical configuration where the visual perspective makes it hard to assess the evenness of the strake wrapping pattern. In general, strake installations are difficult, time-consuming, and result in inconsistent arrangement of the stakes.

Accordingly, the present disclosure is directed to systems and methods for installing strakes in the field that address at least some of the practical challenges discussed above.

BRIEF DESCRIPTION

Aspects and advantages of the invention will be set forth in part in the following description, or may be obvious from the description, or may be learned through practice of the invention.

In one aspect, the present disclosure is directed to a wind turbine that includes a tower, which may be formed of tower sections. The wind turbine may be an on-shore installation or an off-shore installation. The wind turbine includes a vortex-induced vibration (VIV) mitigation system configured on the tower, for example on one or more sections of the tower. The VIV mitigation system includes one more rods connected to an outer surface of the tower so as to extend longitudinally along an axis of the tower. The rods may be flush against or spaced from the outer surface of the tower. A plurality of strake support guides extend transversely from and are spaced apart along the rods, the strake support guides having a length and a shape so as to retain a strake supported thereon. The VIV mitigation system includes one or more strakes wrapped in a helical pattern around the tower, wherein at least a plurality of wraps of the strake are laid on and supported by the strake support guides. The use of strakes are known in the industry, and the strake may have any suitable conventional configuration, such as a multi-faced geometric design with a hollow profile. A cable or rope may run through the strake for wrapping and attaching the strake to the tower.

In certain embodiments, the rod is a rigid elongated member, such as a lightweight metal beam or bar that is mounted to the tower at one or more connection points. In another embodiment, the rod may be a non-rigid supple member, such as a strap, that is pulled into a longitudinally extending member and mounted to the tower at least at end points thereof.

In a particular embodiment, the VIV mitigation system includes a plurality of the rods and strake support guides spaced circumferentially around the tower.

In a further embodiment, a sufficient number of the strake support guides are provided on the rod such that each wrap of the strake is supported by a respective strake support guide.

In yet another embodiment, the strake support guides are adjustable along a length of the rod to accommodate varying pitches of the helical pattern in the same wrap or between different wrap patterns.

The strake support guides may be movable between a functional position wherein the strake support guides extend essentially perpendicular from the tower and a stowed position wherein the strake support guides are brought adjacent to the tower (i.e., alongside and tangential to the tower). The stowed position may be desired for shipping, transporting, and erecting the tower, particularly if the rod is pre-mounted/assembled on the tower/tower section.

For example, the strake support guides may be non-movably fixed (i.e., rigidly fixed) to the rod, wherein the rod is rotatable relative to the tower to move the strake support guides between the functional position and the stowed position. In this embodiment, the rod may be connected to the outer surface of the tower with a pivotal connection (e.g., a hinged bolt or universal joint) at opposite ends of the rod, wherein the pivotal connections allow for the rotatable movement of the rod relative to the tower.

In another embodiment, the strake support guides may be pivotally mounted on the rod, which is rigidly fixed on the tower, wherein the strake support guides pivot relative to the rod between the functional position and the stowed position.

For example the strake support guides may fold into or against the rod in the stowed position, or may swing sideways away from the rod into the stowed position so as to extend essentially adjacent or alongside and tangentially relative to the tower.

The strake support guides may have various configurations. In some embodiments, the strake support guides may comprise an open profile, such as hook-shaped members, C-shaped or U-shaped member, and the like, wherein the strake can be easily inserted into guides. Closure members, such as an elastic strap or buckle, can be configured with the open profile guides to positively retain the strakes in the guides.

In an alternate embodiment, the strake support guides may have a closed profile, such as a loop or eye-hook configuration, wherein the strake is threaded through the support guides.

The present invention also encompasses various embodiments of a method for installing a vortex-induced vibration (VIV) mitigation system on a wind turbine tower, the method including attaching a rod to an outer surface of the tower so that the rod extends longitudinally along an axis of the tower and providing a plurality of strake support guides on the rod that extend transversely from and are spaced apart along the rod, the strake support guides comprising a length and a shape to retain a strake supported thereon. The method includes wrapping a strake in a helical pattern around the tower, including laying at least a plurality of wraps of the strake on the strake support guides.

In a particular embodiment, the rod with strake support guides is pre-mounted on the tower before erecting the tower into a vertical orientation at a field site of the wind turbine. Alternatively, the rod with strake support guides may be installed on the tower (tower section) at the field site with the tower in a vertical or horizontal orientation, wherein the strake is then wrapped around the tower in a vertical or horizontal orientation of the tower.

Various embodiments of the method include installing or operating any of the embodiments of the VIV mitigation system described above.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
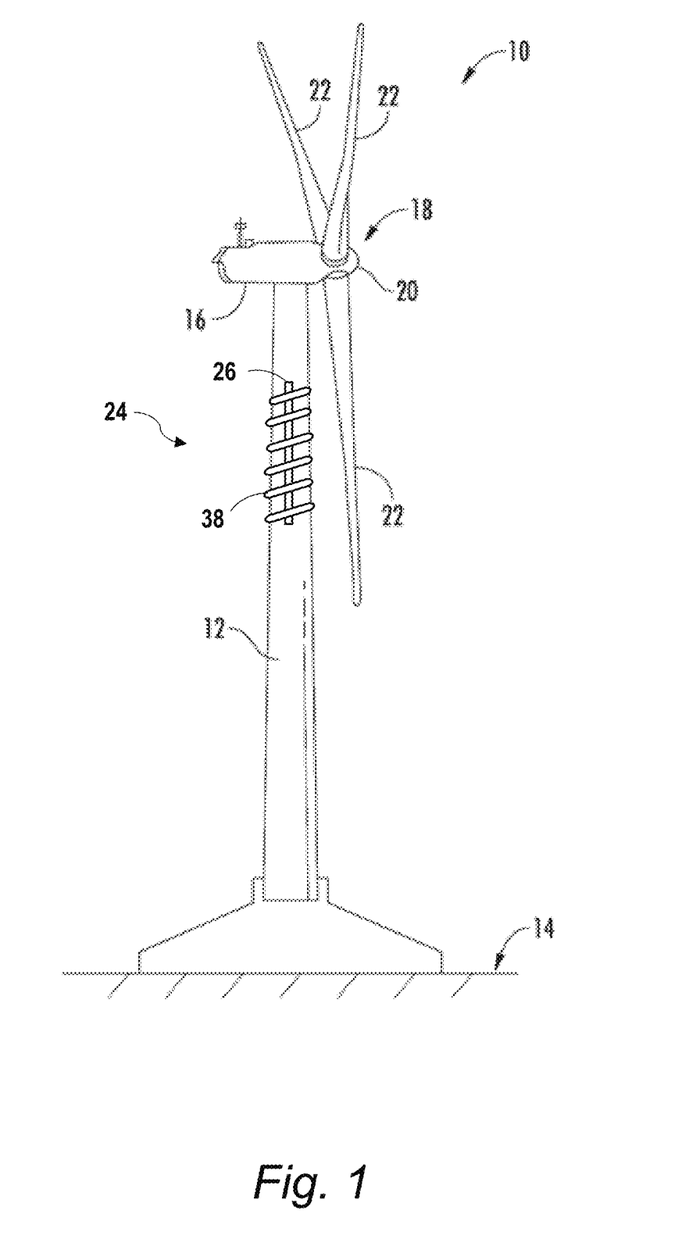
FIG. 1 is a view of a wind turbine with a VIV mitigation system in accordance with aspects of the invention.

Referring to the drawings, FIG. 1 illustrates a perspective view of one embodiment of a wind turbine 10 configured with a vortex-induced vibration (VIV) mitigation system 24 in accordance with aspects of the present disclosure. As shown, the wind turbine 10 generally includes a tower 12 extending from a support surface 14, a nacelle 16 mounted on the tower 12, and a rotor 18 coupled to the drivetrain components located within the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Although FIG. 1 depicts an "on-shore" (land-based) wind turbine 10 installation, it should be appreciated that the present invention is not limited to onshore wind turbines and is just as applicable to "off-shore" (water-based) wind turbine installations.

The wind turbine 10 includes the vortex-induced vibration (VIV) mitigation system 24 configured on the tower 12, for example on one or more sections 30 of the tower 12. The VIV mitigation system 24 may desirably be pre-mounted in whole or in part to the tower section 30 at a manufacturing facility to minimize site work and tower 12 installation time at the wind turbine field site. The VIV mitigation system 24 may be configured on one or multiple sections 30 of the same tower 12.

In the illustrated embodiments, the VIV mitigation system 24 includes a rod 26 connected to an outer surface 54 of the tower 12 and extending longitudinally along an axis 32

(FIG. 2) of the tower 12. The rod 26 may extend parallel to the longitudinal axis 32 or at an angle relative to the axis 32. The rod 26 need not extend perfectly vertical on the tower 12. The rod 26 may be mounted flush against the tower surface 54 or may be spaced from the tower surface 54.

Figure 2:
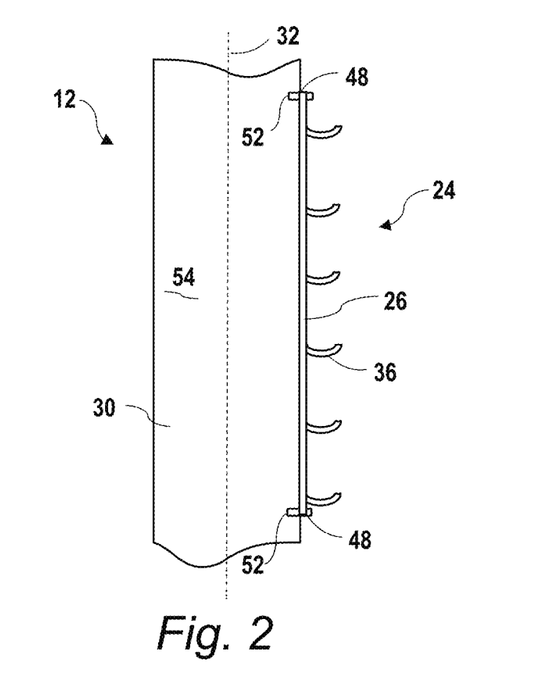
FIG. 2 is a side view of a section of a wind turbine tower with an embodiment of a VIV mitigation system (without strakes)

A plurality of strake support guides 36 extend transversely from and are spaced apart along the rod 26. These strake support guides 36 can take on various shapes and forms, but generally have a length and a shape to retain a strake 38 (FIG. 4) supported thereon. For example, in some embodiments, the strake support guides 36 may comprise an open profile, such as hook-shaped members, C-shaped or U-shaped member as depicted in FIG. 2, and the like, wherein a strake 38 an be easily inserted into guides. Closure members, such as an elastic strap or buckle, can be configured with the open profile guides to positively retain the strakes in the guides.

Figure 10:
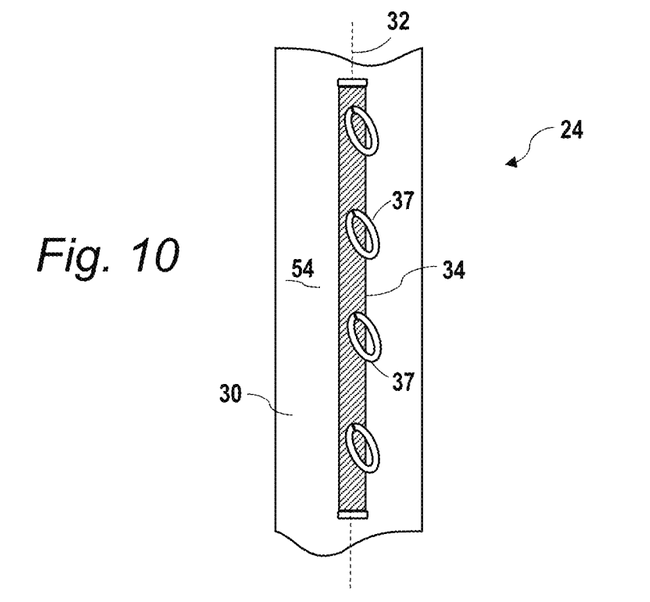
FIG. 10 is a side view of a section of a wind turbine tower with an embodiment of a VIV mitigation system that utilized a strap rod and loop-type strake support guides.

In an alternate embodiment depicted in FIG. 10, the strake support guides 36 may have a closed profile, such as a loop or eye-hook configuration, wherein the strake 38 is threaded through the support guides.

Figure 4:
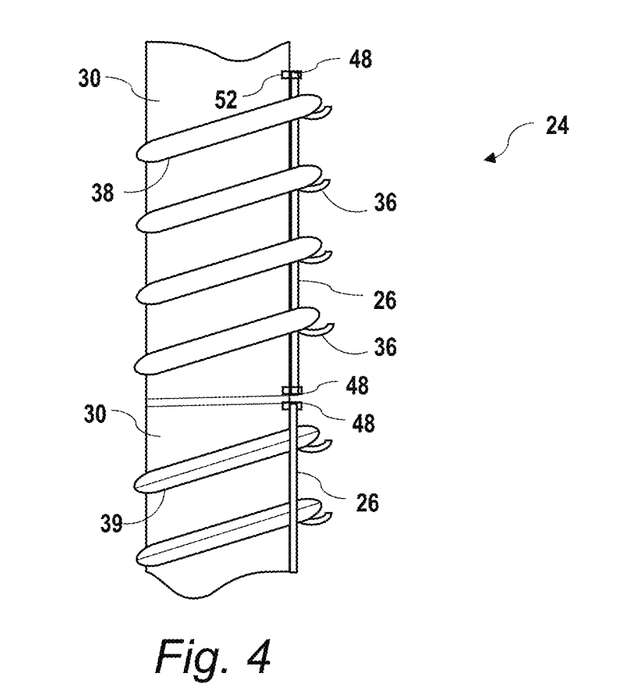
FIG. 4 is a side view of sections of a wind turbine tower with an embodiment of a VIV mitigation system.

Referring to FIG. 4, the VIV mitigation system 24 includes the strake 38 wrapped in a helical pattern around the tower section 30, wherein at least a plurality of wraps of the strake 38 are laid on and supported by the strake support guides 36. A "wrap" may be considered as a complete revolution of the strake 38 relative to a longitudinal reference line. If each wrap of the strake 38 is supported by a strake support guide 36 (as in FIG. 4), then the spacing of the guides 36 along the rod 26 establishes the pitch (angle) of the wraps relative to the axis 32 as well as the number of wraps of the strake 38 per unit length of the tower section 30.

As mentioned, the use of strakes 38 for mitigation of vibration induced vortices is known in the industry, and the strake 38 may have any suitable conventional configuration. For example, in the upper tower section 30 depicted in FIG. 4, the strake 38 has a generally tubular shape with a circular hollow cross-sectional profile. In the lower tower section 30, the strake is depicted as a multi-faceted strake 39 having a triangular or other multi-sided hollow profile. A cable or rope (not depicted in the figures) may run through the strake 38, 39 for wrapping and attaching the strake 38, 39 to the tower section 30, as is known in the industry. It is also known to fill the hollow strakes 38, 39 with a filler material, or to inflate the strakes 38, 39.

Figure 8:
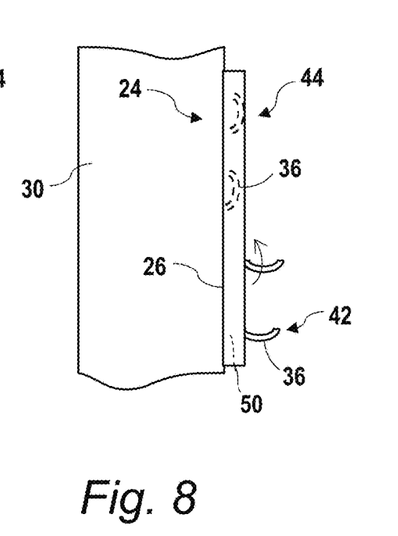
FIG. 8 is a side view of a section of a wind turbine tower depicting movement of the strake support guides into a stowed position in still a different embodiment of a VIV mitigation system.

In certain embodiments, the rod 26 is a rigid elongated member, such as a lightweight metal beam or bar, that is mounted to the tower section 30 at one or more connection points. For a rigid member, it may suffice to mount the rod 26 at opposite ends 48 thereof using any conventional fastener or connector 52 (e.g., bolt, rivet, etc.). In the embodiment of FIG. 8, the rod 26 is rigid and has a U-shaped cross-sectional profile that defines an open interior channel storage space 50, as explained below.

Referring to FIG. 10, in an alternate embodiment the rod can be a non-rigid supple member 34, such as a canvas or polymer strap, that is mounted at its opposite ends 48 to the tower section 30. Once the supple member 34 is pulled taunt and mounted to the tower section 30, it functions essentially the same as a rigid rod member 26. In this embodiment, the strake support guides 36 may also be formed by non-rigid loops 37, such as canvas or polymer material loops sewn onto the strap 34. This embodiment has benefits as to the weight and costs of the rod 26 component of the VIV mitigation system 24, as well as ease of transport and installation.

Figure 3:
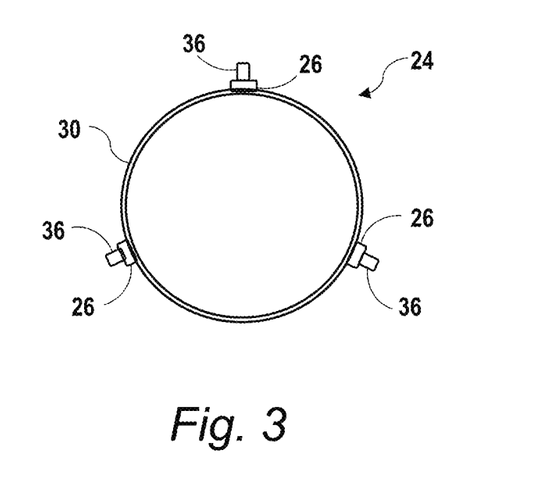
FIG. 3 is a top view of a section of a wind turbine tower with an embodiment of a VIV mitigation system (without strakes)

The VIV mitigation system 24 may utilize a single rod 26 or a plurality of the rods 26 spaced circumferentially around the circumference of the tower section 30, as depicted in FIG. 3.

Figure 9:
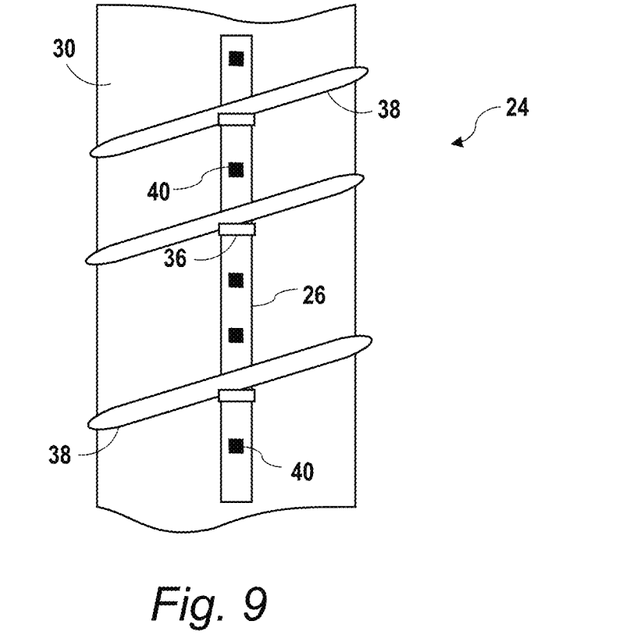
FIG. 9 is a side view of a section of a wind turbine tower depicting adjustable strake support guides on the rod of an embodiment of a VIV mitigation system.

The strake support guides 36 may be fixed in position and non-movable relative to the rod 26. For example, the guides may be welded, bolted, adhered, or otherwise permanently fixed in position on the rod 26. Alternately, the strake support guides 36 may be adjustable in position along a length of the rod 26 to accommodate varying pitches of the helical pattern wraps of the strake 38 or spacing between the wraps, as depicted in FIG. 9. For example, the rod 26 may include spaced-apart connection points 40 for the guides 36 in the form of mounting holes, slots, or the like, into which a projection on the guides 36 can be inserted. The guides 36 may also non-removably connected to the rod 26 and slidable along a channel formed in the rod 26. Various means or devices are readily envisioned to render the guides 36 adjustable in position along the rod 26.

Figure 6:
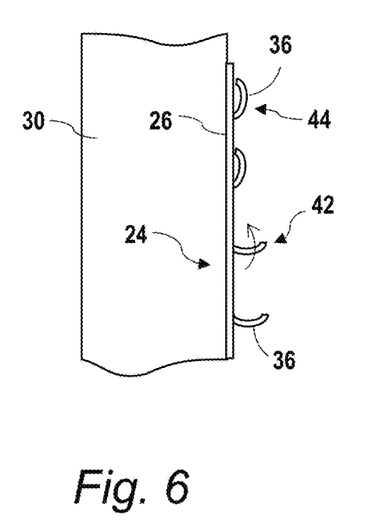
FIG. 6 is a side view of a section of a wind turbine tower depicting movement of the strake support guides into a stowed position in an embodiment of a VIV mitigation system.
Figure 7:
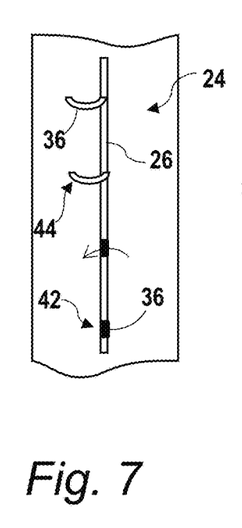
FIG. 7 is a side view of a section of a wind turbine tower depicting movement of the strake support guides into a stowed position in another embodiment of a VIV mitigation system.

Referring to FIGS. 6 through 8, the strake support guides 36 may be movable between a functional position 42 wherein the strake support guides 36 extend essentially perpendicular from the tower section 30 and a stowed position 44 wherein the strake support guides 36 are brought adjacent to the tower section 30 (i.e., alongside and tangential to the tower). The stowed position 44 may be desired for shipping, transporting, and erecting the tower, particularly if the rod 26 is pre-mounted/assembled on the tower/tower section 30.

For example, in the embodiment of FIG. 6, the strake support guides 36 are pivotally mounted on the rod 26, which may be rigidly fixed on the tower section 30, and pivotal between the functional position 42 where they extend transversely from the rode 26 and the stowed position 44 where they fold up against the rod 26. Similarly, in the embodiment of FIG. 8 where the rod 26 has the generally U-shaped profile, the strake support guides 36 fold or pivot into the channel storage space 50 within the rod 26. The strake support guides 36 may be connected together so that they deploy or retract together, for example via a gearing or wire/tether system.

In the embodiment of FIG. 7, the strake support guides swing sideways away from the rod 26 into the stowed position 44 where they extend essentially adjacent or alongside the tower.

Figure 5A:
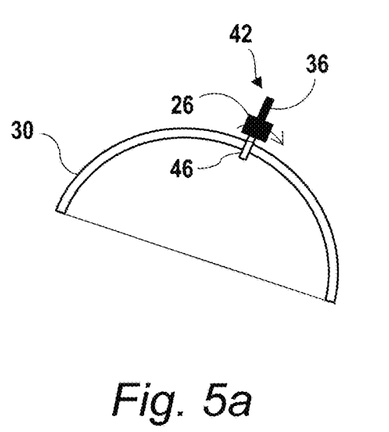
FIGS. 5*a* and 5*b* are operational top views of a wind turbine tower depicting pivotal movement of the rod and strake support guides relative to the tower.
Figure 5B:
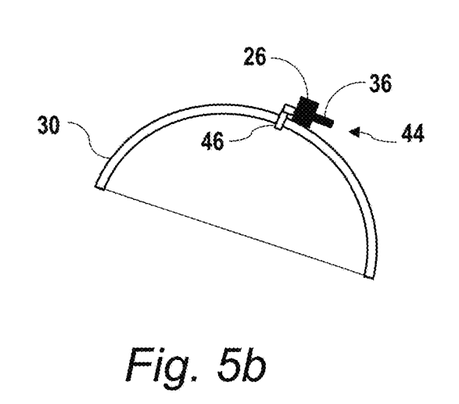

In the embodiment of FIGS. 5a and 5b, the strake support guides 36 are non-movably fixed (i.e., rigidly fixed) to the rod 26. However, the rod 26 is rotatable relative to the tower section 30 such that the entire assembly of the rod 26 and fixed guides 36 rotate sideways from the functional position 42 depicted in FIG. 5a to the stowed position 44 depicted in FIG. 5b. Any manner of pivotal connection 46, such as a universal joint or hinged device, may be used to mount the rod 26 to the tower section 30 for this purpose.

The present invention also encompasses various embodiments of a method for installing the embodiments of the vortex-induced vibration (VIV) mitigation system 24 on a wind turbine tower 12 or tower section 30, as discussed above. In this regard, the method includes attaching a rod 26 to an outer surface 54 of the tower 12, 30 so that the rod 26 extends longitudinally along an axis 32 of the tower 12, 30 and providing a plurality of strake support guides 36 on the rod 26 that extend transversely from and are spaced apart along the rod 26. The method includes wrapping a strake 38 in a helical pattern around the tower 12, 30, including laying at least a plurality of wraps of the strake 38 on the strake support guides 36.

The method may include pre-mounting the rod 26 with strake support guides 36 on the tower section 30 before erecting the tower 12 into a vertical orientation at a field site of the wind turbine 10. Alternatively, the rod 26 with strake support guides 36 may be installed on the tower 12, 30 at the field site with the tower 12 in a vertical or horizontal orientation, wherein the strake 38 is then wrapped around the tower 12, 30 in a vertical or horizontal orientation of the tower 12.

It is not necessary that the rods 36 be removed from the tower 12 after installation of the wind turbine 10. The rods 36 may be designed to remain attached to the tower 12 even after installation. For example, the rods 36 may be relatively compact and have a low surface profile relative to the tower 12, and may also have a color to essentially blend with the tower.

Further aspects of the invention are provided by the subject matter of the following clauses:

Clause 1: A wind turbine, comprising:
a tower;
a vortex-induced vibration (VIV) mitigation system configured on the tower, the VIV mitigation system comprising:
a rod attached to an outer surface of the tower and extending longitudinally along an axis of the tower;
a plurality of strake support guides extending transversely from and spaced apart along the rod, the strake support guides comprising a length and a shape to retain a strake supported thereon; and
a strake wrapped in a helical pattern around the tower, wherein at least a plurality of wraps of the strake are laid on and supported by the strake support guides.

Clause 2: The wind turbine as in clause 1, wherein the VIV mitigation system comprises a plurality of the rods and strake support guides spaced circumferentially around the tower.

Clause 3: The wind turbine as in clause 1, wherein a number of the strake support guides are provided sufficient to support each wrap of the strake around the tower.

Clause 4: The wind turbine as in clause 1, wherein the strake support guides are adjustable in position along a length of the rod so as to accommodate varying pitches of the helical pattern of the strake.

Clause 5: The wind turbine as in clause 1, wherein the strake support guides are movable between a functional position wherein the strake support guides extend essentially perpendicular from the tower and a stowed position wherein the strake support guides are brought to a position so as to extend along and adjacent to the tower.

Clause 6: The wind turbine as in clause 5, wherein the strake support guides are non-movably fixed to the rod, and the rod is rotatable relative to the tower to move the strake support guides between the functional position and the stowed position.

Clause 7: The wind turbine as in clause 6, wherein the rod is connected to the outer surface of the tower with a pivotal connection at opposite ends of the rod, the pivotal connections allowing for the rotatable movement of the rod relative to the tower.

Clause 8: The wind turbine as in clause 5, wherein the strake support guides are pivotally mounted on the rod and pivotal relative to the rod between the functional position and the stowed position.

Clause 9: The wind turbine as in clause 8, wherein the strake support guides are foldable vertically into or against the rod in the stowed position.

Clause 10: The wind turbine as in clause 8, wherein the strake support guides are swingable sideways away from the rod into the stowed position so as to extend essentially adjacent and tangentially relative to the tower.

Clause 11: The wind turbine as in clause 1, wherein the rod comprises an elongated rigid member or a supple strap member.

Clause 12: A method for installing a vortex-induced vibration (VIV) mitigation system on a wind turbine tower, comprising:
attaching a rod to an outer surface of the tower so that the rod extends longitudinally along an axis of the tower;
providing a plurality of strake support guides on the rod that extend transversely from and are spaced apart along the rod, the strake support guides comprising a length and a shape to retain a strake supported thereon; and
wrapping a strake in a helical pattern around the tower, including laying at least a plurality of wraps of the strake on the strake support guides.

Clause 13: The method as in clause 12, wherein the rod with attached strake support guides is pre-mounted on a section of the tower before erecting the tower at a field site of the wind turbine.

Clause 14: The method as in clause 12, comprising attaching a plurality of the rods with strake support guides circumferentially around the tower.

Clause 15: The method as in clause 12, comprising adjusting a location of the strake support guides vertically along the rod to accommodate varying pitches of the helical pattern.

Clause 16: The method as in clause 12, comprising moving the strake support guides between a functional position wherein the strake support guides extend essentially perpendicular from the tower and a stowed position wherein the strake support guides are brought adjacent to the tower.

Clause 17: The method as in clause 16, wherein the strake support guides are non-movably fixed to the rod, and the rod is rotated relative to the tower to move the strake support guides between the functional position and the stowed position.

Clause 18: The method as in clause 16, wherein the rod is connected to the outer surface of the tower with a pivotal connection at opposite ends of the rod, the pivotal connections allowing for the rotatable movement of the rod relative to the tower.

Clause 19: The method as in clause 16, wherein the strake support guides are pivotally mounted on the rod and are pivoted relative to the rod between the functional position and the stowed position.

Clause 20: The method as in clause 19, the strake support guides are folded into or against the rod in the stowed position or are swung sideways away from the rod in the stowed position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A wind turbine, comprising:
a tower;

a vortex-induced vibration (VIV) mitigation system configured on the tower, the VIV mitigation system comprising:
  at least one rod attached to an outer surface of the tower and extending longitudinally along an axis of the tower;
  a plurality of support guides extending transversely from and spaced apart along the at least one rod; and
  at least one strake wrapped in a helical pattern around the tower, wherein at least a plurality of wraps of the strake are laid on and supported by the support guides.

2. The wind turbine as in claim 1, wherein the VIV mitigation system comprises a plurality of the rods with support guides provided thereon spaced circumferentially around the tower.

3. The wind turbine as in claim 1, wherein a sufficient number of the support guides are provided to support each wrap of the strake around the tower.

4. The wind turbine as in claim 1, wherein the support guides are adjustable in position along a length of the at least one rod so as to accommodate varying pitches of the helical pattern of the strake.

5. The wind turbine as in claim 1, wherein the support guides are movable between a functional position wherein the support guides extend essentially perpendicular from the tower and a stowed position wherein the support guides are brought to a position so as to extend along and adjacent to the tower.

6. The wind turbine as in claim 5, wherein the support guides are non-movably fixed to the at least one rod, and the at least one rod is rotatable relative to the tower to move the support guides between the functional position and the stowed position.

7. The wind turbine as in claim 6, wherein the at least one rod is connected to the outer surface of the tower with a pivotal connection at opposite ends of the at least one rod, the pivotal connections allowing for the rotatable movement of the at least one rod relative to the tower.

8. The wind turbine as in claim 5, wherein the support guides are pivotally mounted on the at least one rod and pivotal relative to the at least one rod between the functional position and the stowed position.

9. The wind turbine as in claim 8, wherein the support guides are foldable vertically into or against the at least one rod in the stowed position.

10. The wind turbine as in claim 8, wherein the support guides are swingable sideways away from the at least one rod into the stowed position so as to extend essentially adjacent and tangentially relative to the tower.

11. The wind turbine as in claim 1, wherein the at least one rod comprises an elongated rigid member or a supple strap member.

12. A method for installing a vortex-induced vibration (VIV) mitigation system on a wind turbine tower, comprising:
  attaching a rod to an outer surface of the tower so that the rod extends longitudinally along an axis of the tower;
  providing a plurality of support guides on the rod that extend transversely from and are spaced apart along the rod; and
  wrapping at least one strake in a helical pattern around the tower, including laying at least a plurality of wraps of the strake on the support guides.

13. The method as in claim 12, wherein the rod with support guides provided thereon is pre-mounted on a section of the tower before erecting the tower at a field site of the wind turbine.

14. The method as in claim 12, further comprising attaching at least one additional rod with support guides provided thereon circumferentially around the tower.

15. The method as in claim 12, comprising adjusting a location of the support guides vertically along the rod to accommodate varying pitches of the helical pattern.

16. The method as in claim 12, comprising moving the support guides between a functional position wherein the support guides extend essentially perpendicular from the tower and a stowed position wherein the support guides are brought adjacent to the tower.

17. The method as in claim 16, wherein the support guides are non-movably fixed to the rod, and the rod is rotated relative to the tower to move the support guides between the functional position and the stowed position.

18. The method as in claim 16, wherein the rod is connected to the outer surface of the tower with a pivotal connection at opposite ends of the rod, the pivotal connections allowing for the rotatable movement of the rod relative to the tower.

19. The method as in claim 16, wherein the support guides are pivotally mounted on the rod and are pivoted relative to the rod between the functional position and the stowed position.

20. The method as in claim 19, the support guides are folded into or against the rod in the stowed position or are swung sideways away from the rod in the stowed position.

* * * * *